(12) United States Patent
Dobrila et al.

(10) Patent No.: US 10,733,301 B2
(45) Date of Patent: Aug. 4, 2020

(54) COMPUTING DEVICE PROTECTION BASED ON DEVICE ATTRIBUTES AND DEVICE RISK FACTOR

(71) Applicant: Microsoft Technology Licensing, LLC, Redmond, WA (US)

(72) Inventors: Tudor Alexandru Dobrila, Seattle, WA (US); Caglar Gunyakti, Redmond, WA (US); Brian Paul Bussone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/245,751

(22) Filed: Aug. 24, 2016

(65) Prior Publication Data
US 2018/0060591 A1 Mar. 1, 2018

(51) Int. Cl.
| G06F 21/00 | (2013.01) |
| G06F 21/57 | (2013.01) |
| G06F 21/56 | (2013.01) |
| H04L 29/06 | (2006.01) |

(52) U.S. Cl.
CPC ........... G06F 21/577 (2013.01); G06F 21/56 (2013.01); G06F 21/566 (2013.01); H04L 63/1425 (2013.01); H04L 63/1433 (2013.01)

(58) Field of Classification Search
CPC .. G06F 21/56; H04L 63/1425; H04L 63/1433
See application file for complete search history.

(56) References Cited

U.S. PATENT DOCUMENTS

| 7,594,272 | B1 | 9/2009 | Kennedy et al. |
| 8,413,235 | B1 | 4/2013 | Chen et al. |
| 8,590,045 | B2 | 11/2013 | Niemela et al. |
| 8,661,547 | B1 | 2/2014 | Kononov et al. |
| 9,111,094 | B2 | 8/2015 | Turbin et al. |
| 9,166,999 | B1 | 10/2015 | Kulkarni et al. |

(Continued)

OTHER PUBLICATIONS

"International Search Report and Written Opinion Issued in PCT Application No. PCT/US2017/047241", dated Nov. 7, 2017, 10 Pages.

(Continued)

*Primary Examiner* — Tri M Tran
(74) *Attorney, Agent, or Firm* — Fiala & Weaver P.L.L.C.

(57) ABSTRACT

A computing device communicates a request to a risk determination system to determine whether particular content is malware. The content is oftentimes a file containing a program to be run, but can alternatively take other forms, and an indication of the content is provided to the risk determination system. Additional information describing attributes of the computing device is also provided to the risk determination system. These attributes can include for the computing device hardware specifications, operating system specifications, anonymized information, information describing anti-virus or other anti-malware program settings, information describing programs running on the computing device, and so forth. The risk determination system analyzes the information describing attributes and/or activity of the computing device to determine a risk factor of the content, and from the risk factor determines whether the content is malware for the computing device.

19 Claims, 5 Drawing Sheets

(56) References Cited

U.S. PATENT DOCUMENTS

| | | | |
|---|---|---|---|
| 9,197,663 B1* | 11/2015 | Gilbert | G06F 3/04817 |
| 9,262,635 B2 | 2/2016 | Paithane et al. | |
| 9,292,688 B2 | 3/2016 | Avasarala et al. | |
| 9,306,971 B2 | 4/2016 | Altman et al. | |
| 2008/0184371 A1 | 7/2008 | Moskovitch et al. | |
| 2010/0100963 A1 | 4/2010 | Mahaffey | |
| 2011/0083180 A1* | 4/2011 | Mashevsky | G06F 21/55 |
| | | | 726/23 |
| 2011/0247074 A1 | 10/2011 | Manring et al. | |
| 2012/0066346 A1* | 3/2012 | Virmani | G06F 16/164 |
| | | | 709/219 |
| 2012/0102568 A1 | 4/2012 | Tarbotton et al. | |
| 2013/0097706 A1 | 4/2013 | Titonis et al. | |
| 2013/0111586 A1* | 5/2013 | Jackson | G06F 11/3438 |
| | | | 726/23 |
| 2015/0199517 A1* | 7/2015 | Rose | G06F 21/57 |
| | | | 726/22 |
| 2016/0098565 A1* | 4/2016 | Vedula | G06F 21/577 |
| | | | 726/24 |
| 2017/0026343 A1* | 1/2017 | Wardman | H04L 63/0421 |
| 2018/0018465 A1* | 1/2018 | Carey | G06F 21/577 |

OTHER PUBLICATIONS

Gabriel, et al., "Analyzing Malware Log Data to Support Security Information and Event Management: Some Research Results", In Proceedings of First International Conference on Advances in Databases, Knowledge, and Data Applications, Mar. 1, 2009, pp. 108-113.

* cited by examiner

COMPUTING DEVICE PROTECTION BASED ON DEVICE ATTRIBUTES AND DEVICE RISK FACTOR

BACKGROUND

As computing technology has advanced, computing devices have become increasingly interconnected. Although this increased interconnection provides users with access to large amounts of information and other devices, it is not without its problems. One such problem is that users' devices are exposed to various different threats, including malicious users attempting to install various different malware programs on their devices. It remains difficult to protect computing devices against such threats.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a description of attributes of a computing device is obtained and activity of the computing device is optionally determined. An indication of content to be accessed at the computing device is received from the computing device. A risk factor for the computing device is determined based on the attributes of the computing device and/or the activity of the computing device, and the risk factor of the computing device as well as the indication of the content is used to determine whether the content is malware on the computing device. An indication of whether the content on the computing device is determined to be malware is communicated to the computing device.

In accordance with one or more aspects, a description of attributes of a computing device is collected. The description of the attributes of the computing device is communicated to a risk determination system, and a request for a determination of whether content at the computing device is malware is also communicated to the risk determination system. An indication of whether the content is malware is received from the risk determination system, the indication being based on a risk factor for the computing device, the risk factor for the computing device being based on the attributes of the computing device and/or the activity of the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
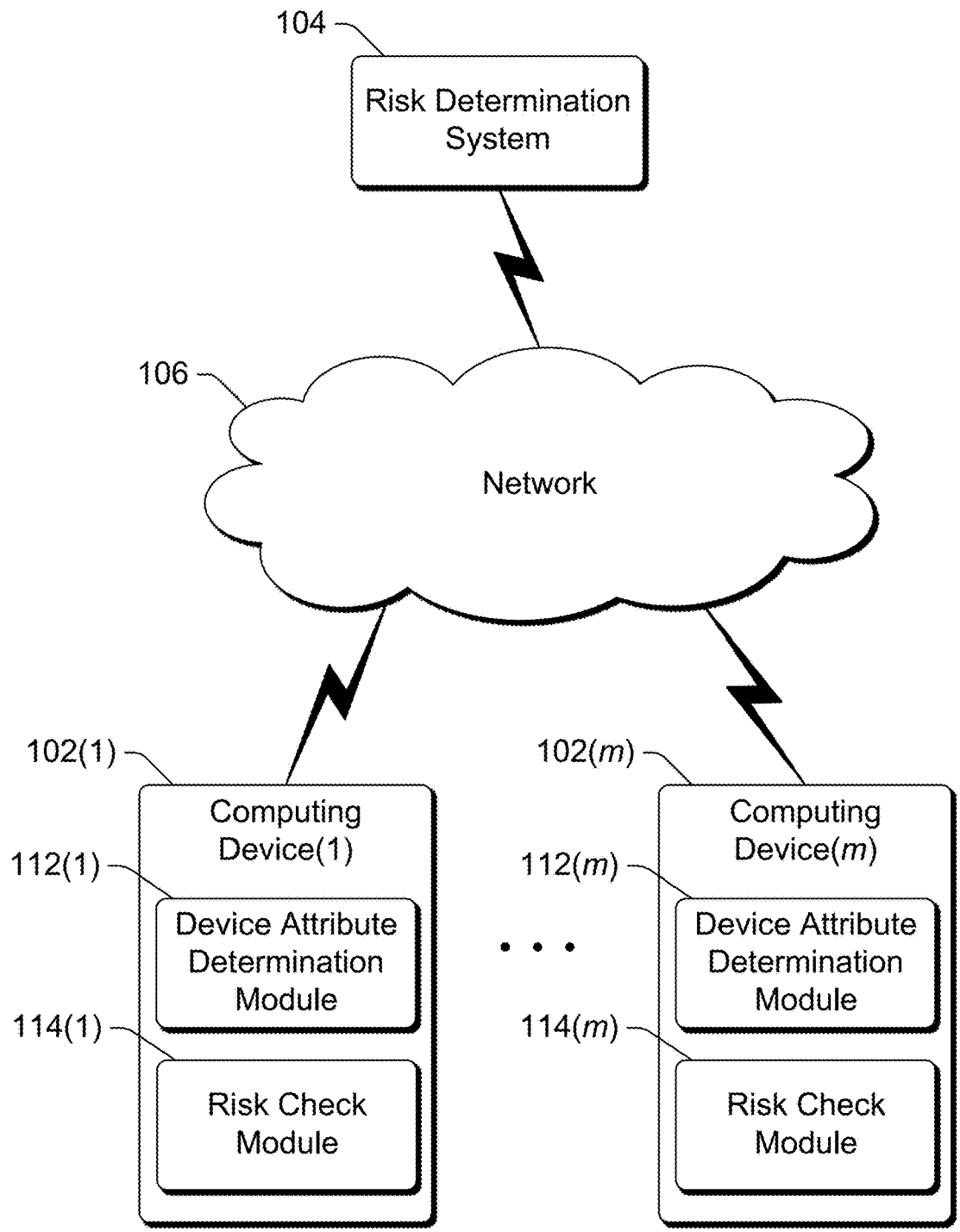
FIG. 1 illustrates an example system implementing the computing device protection based on device attributes and device risk factor in accordance with one or more embodiments.

Computing device protection based on device attributes and device risk factor is discussed herein. A risk determination system is accessible to computing devices, typically over a network such as the Internet. When content is accessed on a computing device, the computing device sends an indication of the content to the risk determination system. The content is oftentimes a file containing a program to be run, but can alternatively take other forms. The indication can also take various forms, such as a hash or digest value representing the content, behavior of the content or the content itself. Accessing the content refers to actions taken with the content, such as running the content, downloading or otherwise storing the content on the computing device, installing the content on the computing device, and so forth.

Additional information describing attributes of the computing device are also provided to the risk determination system. These attributes can include, for example, hardware specifications of the computing device, operating system specifications of the computing device, anonymized information regarding a user of the computing device, information describing anti-virus or other anti-malware program settings on the computing device, information describing programs running on the computing device, combinations thereof, and so forth.

Additional information describing activity of the computing device is also provided to or determined by the risk determination system. The computing device activity refers to an amount that the computing device is used or a frequency of use of the computing device. For example, the computing device activity can be number of days each week that the computing device is used, a number of hours each day that the computing device is used, and so forth. A computing device being used refers to the computing device being powered on and running one or more programs (e.g., not in a sleep or hibernation mode).

The risk determination system analyzes the information describing attributes of the computing device to determine a risk factor of the content on the computing device. This risk factor is a rating or value indicating the probability or likelihood of the computing device being infected with malware sometime in the future. A determination of whether the content is malware is then made based on the indication of the content as well as the risk factor for the computing device. The risk factor is determined based on the attributes of the computing device, so the malware determination for the content is not based on the indication of the content alone. This can result in different computing devices with different attributes having different malware determinations for the same content.

The techniques discussed herein allow information regarding the computing device itself to be taken into account in determining whether particular content is malware. Malware refers to malicious or hostile content, typically designed to attack, take control of, or otherwise interfere with users' desired use of their computing devices.

In some situations, such as where the indication of particular content is known to correspond to safe content or to malware, then a malware determination for the content (e.g., malware or not malware) can be determined with a high degree of confidence. However, in situations in which the indication of particular content is not known to correspond to safe content or to malware, the use of attributes of the computing device allow the risk determination system to determine a risk factor associated with the computing device, and thus make the malware determination for the content with a higher degree of confidence and/or change the manner in which the computing device interacts with the content. For example, a set of computing devices X may have one particular set of attributes A and be more susceptible to infection from malware than a set of computing devices Y with another set of attributes B. The risk determination system can thus indicate a higher risk factor for the set of computing devices X than for the set of computing devices Y, and thus be more likely to determine that the content is malware and/or change its behavior with respect to the content if the content is being accessed on the set of computing devices X than when being accessed on the set of computing devices Y.

FIG. 1 illustrates an example system 100 implementing the computing device protection based on device attributes and device risk factor in accordance with one or more embodiments. System 100 includes multiple (m) computing devices 102 that can each communicate with a risk determination system 104 via a network 106. Network 106 can be a variety of different networks, including the Internet, a local area network (LAN), a public telephone network, an intranet, other public and/or proprietary networks, combinations thereof, and so forth.

Each computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, each computing device 102 may range from a full resource device with substantial memory and processor resources (e.g., personal computers, game consoles) to a low-resource device with limited memory and/or processing resources (e.g., traditional set-top boxes, hand-held game consoles). Different ones of computing devices 102 can be the same or different types of computing devices.

Risk determination system 104 is implemented by one or more devices that can each be a variety of different types of computing devices. Similar to the discussion of computing device 102, the risk determination system 104 can be implemented by devices ranging from full resource devices with substantial memory and processor resources to low-resource devices with limited memory and/or processing resources.

Each computing device 102 includes a device attribute determination module 112 and a risk check module 114. For each computing device 102, the device attribute determination module 112 of that computing device 102 determines various attributes of that computing device 102. These attributes can include, for example, hardware specifications of the computing device, operating system specifications of the computing device, anonymized information regarding a user of the computing device, information describing antivirus or other anti-malware program settings on the computing device, information describing programs running on the computing device, combinations thereof, and so forth as discussed in more detail below.

For each computing device 102, the risk check module 114 of that computing device 102 checks whether content on that computing device 102 is malware (or checks for a risk factor or likelihood that content on that computing device 102 is malware). The risk check module 114 performs this check by providing an indication of the content as well as attributes of the particular computing device 102 to the risk determination system 104. The risk determination system 104 analyzes the indication of the content along with the attributes of the particular computing device 102, and returns an indication of whether the content is malware.

The risk check module 114 can check various different types of content. In one or more embodiments, the content is a program that may be run at the computing device 102. The program can be a binary file, or alternatively another file or data structure that is executed, interpreted, or otherwise run. Additionally or alternatively, the content can take other forms, such as video content that is displayed, audio content that is audibly played back, and so forth.

The risk check module 114 obtains an indication of the content. The risk check module 114 can generate the indication, or alternatively can obtain the indication of the content elsewhere (e.g., from another component or module of the computing device 102). The indication of the content can take various forms, such as a hash value generated by applying a hash function (e.g., a cryptographic hash function) to the content (the entire content or a portion of the content), the content itself, another identifier that uniquely identifies the content to the risk determination system 104, and so forth.

The risk check module 114 can check the content at various different times. In one or more embodiments, the risk check module 114 checks the content when the content is run. The risk check module 114 can check the content each time the content is run, or alternatively less frequently. For example, the risk check module 114 can check the content the first time the content is run but not re-check the content each time the same content is re-run. Whether the content is the same can be determined in various manners (e.g., by using a hash function to generate a hash value for the content and verifying that when the content is subsequently run the hash value has not changed). Additionally or alternatively, the risk check module 114 can check the content at other times, such as when the content is downloaded or otherwise acquired by the computing device 102.

For each computing device 102, in addition to the indication of the content the risk check module 114 of that computing device 102 provides to the risk determination system 104 the attributes of that computing device 102. The risk check module 114 can provide the attributes of the computing device 102 to the risk determination system 104 along with (e.g., at the same time as) the indication of the content, or alternatively at different times. For example, the computing device 102 can provide the attributes of the computing device 102 to the risk determination system 102, which stores the attributes. When the risk check module 114 subsequently provides the indication of the content to the risk determination system 102 (e.g., which may be hours, days, weeks, etc. later), the risk determination system 102 retrieves the stored attributes of the computing device 102.

The device attribute determination module 112 determines the attributes of the computing device 102. The device attribute determination module 112 can determine the attributes of the computing device 102 in various manners, and can get different attributes from the same and/or different sources. For example, the device attribute determination module 112 can query an operating system or other program running on the computing device 102 for the attributes, such as by invoking an application programming interface (API) method exposed by the operating system or other program running on the computing device 102. By way of another example, the device attribute determination module 112 can read data from various data stores (e.g., operating system stores, hardware registers of the computing device 102, other data structures).

Various attributes of the computing device 102 can be determined by the device attribute determination module 112 and provided to the risk determination system 104. These attributes include static attributes that do not change (or change infrequently) over time and/or dynamic attributes that do change (or are expected to change with at least a threshold frequency, such as weekly or monthly).

In one or more embodiments, the attributes of the device include hardware specifications of the computing device 102. The hardware specifications can include, for example, any one or combination of: the form factor of the computing device 102 (e.g., desktop, notebook, detachable, tablet, etc.), the make and model of the computing device 102 (e.g., according to the original equipment manufacturer (OEM) of the computing device 102), the architecture of one or more processors of the computing device 102, an amount or type of physical random access memory (RAM) in the computing device 102, a total storage capacity (e.g., disk drive capacity) of the computing device 102, performance characteristics or capabilities of the hardware of the computing device 102 (e.g., as obtained by various performance tools, such as a Windows® System Assessment Tool (WinSAT)), and so forth.

Additionally or alternatively, the attributes of the device can include operating system specifications of the computing device 102. The operating system specifications can include, for example, any one or combination of: a build number of the operating system running on the computing device 102, an architecture of the operating system running on the computing device 102, a language (e.g., English, French, German, etc.) used by the operating system running on the computing device 102, an installation date of the operating system running on the computing device 102, an installation type (e.g., update, clean install, etc.) of the operating system running on the computing device 102, a pricing stock keeping unit (SKU) of the operating system running on the computing device 102 (e.g., Windows 10 Emerging Market Single Language), a license state of the operating system running on the computing device 102 (e.g., whether the copy of the operating system is genuine), security settings of the operating system running on the computing device 102 (e.g., whether firewall is enabled, whether smart screen is enabled, etc.), and so forth.

Additionally or alternatively, the attributes of the device can include anonymized information regarding a user of the computing device 102 and/or the computing device 102 itself. The user of the computing device 102 is, for example, the user that is logged into the computing device 102. The anonymized information refers to information about the user and/or computing device but that is not associated with the user—a record associating the user with the anonymized information is not maintained. The anonymized information can include, for example, any one or combination of: age group of the user of the computing device 102, the gender of the user of the computing device 102, the geographic location (e.g., country, state, city, etc.) of the computing device 102 and/or of the user of the computing device 102, the customer segment that the user is associated with (e.g., consumer, gaming, enterprise, education, etc.), the amount of different network locations (e.g., Internet Protocol (IP) addresses) visited by the user of the computing device 102, and so forth.

Additionally or alternatively, the attributes of the device can include information describing anti-virus or other anti-malware program settings on the computing device 102. The information describing anti-virus or other anti-malware program settings can include, for example, any one or combination of: a type of antivirus application or other anti-malware program running or installed on the computing device 102, a ranking (e.g., according to any of various industry tests) of the antivirus application or other anti-malware program running or installed on the computing device 102, an exclusion list of the antivirus application or other anti-malware program running or installed on the computing device 102 (e.g., indicating content that is not monitored by the antivirus application or other anti-malware program running or installed on the computing device 102), antivirus application or other anti-malware program security settings on the computing device 102, and so forth.

Additionally or alternatively, the attributes of the device can include information describing programs running on the computing device 102. The information describing programs running on the computing device 102 can include, for example, any one or combination of: a list of software publishers that are running software on the device (e.g. the user is running software created by Microsoft® Corporation)—some software publishers create software that acts as an efficient channel for malware transmission (e.g., there may be a high correlation between devices that have been infected with malware and devices running file sharing clients), the age of applications installed on the computing device 102 (e.g., how long ago the applications were installed on the computing device 102), a number of applications installed on the computing device 102, and so forth.

Additionally or alternatively, the attributes of the device can include information describing security settings of the computing device 102. The information describing security settings of the computing device 102 can include, for example, any one or combination of: whether a firewall on the computing device is enabled or disabled, whether an anti-malware program on the computing device is enabled or disabled, whether a disk encryption feature on the computing device (e.g., the BitLocker® full disk encryption feature) is enabled or disabled, whether a user account control (UAC) feature of the computing device is enabled or disabled, and so forth.

Additionally or alternatively, the attributes of the device can include behavioral information describing the computing device 102 and/or anti-malware program on the computing device 102. The behavioral information can include, for example, any one or combination of: prior infections seen on the computing device, number of folders the user of the computing device excluded from being scanned by anti-malware program (e.g., via a user initiated action in the operating system settings), prior "suspicious" content seen on the computing device (e.g., content for which the risk determination system 104 was not certain was malware but there was enough evidence to believe something was not right with the content), most frequently used (e.g., run)

applications, most frequently run process run-times, previous remediation of threats performed by an anti-malware program on the computing device 102, any other information received from the anti-malware program on the computing device 102, and so forth.

Figure 2:
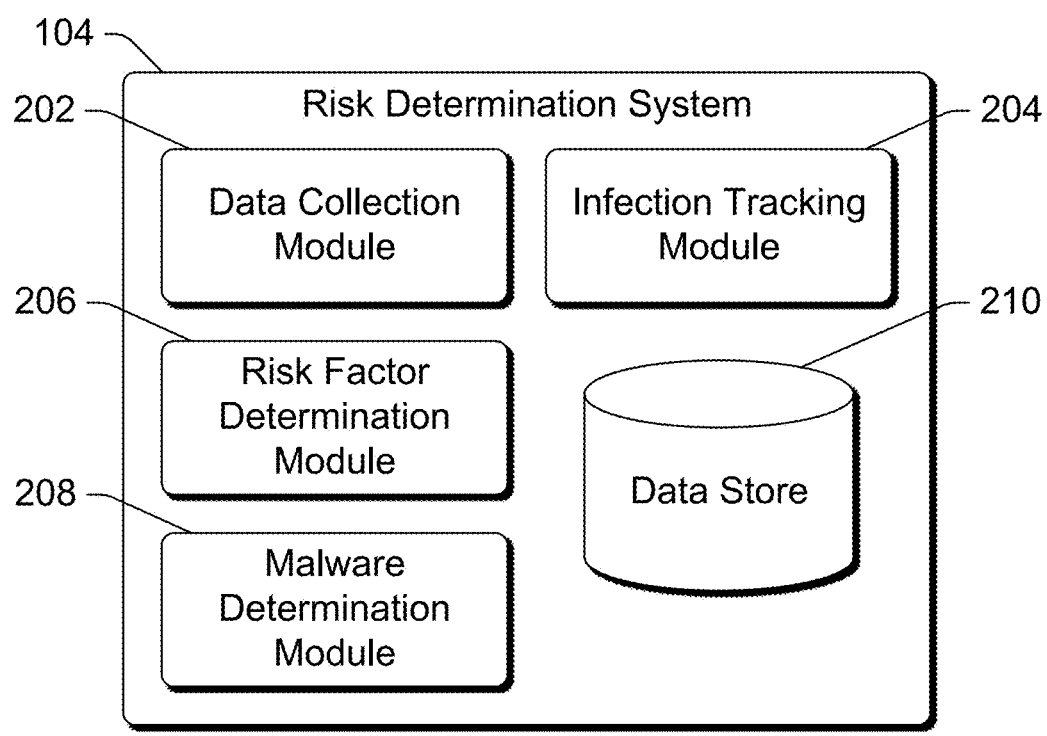
FIG. 2 illustrates an example risk determination system in accordance with one or more embodiments.

FIG. 2 illustrates an example risk determination system 104 in accordance with one or more embodiments. The risk determination system 104 includes a data collection module 202, an infection tracking module 204, a risk factor determination module 206, a malware determination module 208, and a data store 210. The data store 210 can be one or more of any of a variety of different storage devices, such as a disk drive, solid state drive, and so forth.

The data collection module 202 obtains attributes of computing devices and indications of content from various computing devices (e.g., from the risk check modules 114 of the computing devices 102 of FIG. 1). The data collection module 202 also determines the activity of each of the computing devices 102 of FIG. 1. The data collection module 202 communicates with the risk factor determination module 206 and the malware determination module 208 to determine whether content, as indicated by the computing device, is malware (or checks for a risk factor or likelihood that particular content is malware).

The data collection module 202 can receive the attributes of a computing device 102 along with an indication of the content and/or separately. In one or more embodiments, the data collection module 202 receives attributes of computing device 102 and stores those attributes in the data store 210. In response to a subsequently received indication of content, the data collection module 202 receives an indication (e.g., an identifier) of the computing device that is providing the indication of content, and retrieves the stored attributes for that computing device from the data store 210. Alternatively, the risk determination system 104 may maintain no record of the attributes of computing device 102 in data store 210, and the attributes are received from the computing device 102 along with the indication of content. Alternatively, some attributes of the computing device 102 may be maintained in the data store 210 and other attributes of the computing device 102 can be received from the computing device 102 along with the indication of content.

The data collection module 202 also determines the computing device activity for each of the computing devices 102 of FIG. 1. The notion of computing device activity is included in the risk factor determination discussed herein because activity can play an important role in how computing devices get infected with malware (e.g., a computing device used once a month is usually less likely to get infected than one used on a daily basis). The data collection module 202 can determine the activity of a computing device in different manners. In one or more embodiments, the computing device provides a description of the activity of the computing device to the data collection module 202. For example, a module of the computing device 102 (e.g., a device attribute determination module 112 or other module) can generate and provide information describing the activity of the computing device 102 to the data collection module 202. Additionally or alternatively, the data collection module 202 can determine the computing device activity based on other information provided to the data collection module 202 by the computing device 102, such as the attributes of the computing device 102, indications of content received from the computing device 102, indications of infections on the computing device 102, and so forth. For example, the data collection module 202 can determine the activity of a computing device 102 based on how frequently an indication of content is received from the computing device 102.

The infection tracking module 204 tracks which computing devices 102 are identified as infected with malware over time. A computing device 102 being infected with malware includes malware being run or installed on the computing device 102. Additionally or alternatively, a computing device 102 being infected with malware includes an attempt to run or install malware on the computing device 102 being detected.

The infection tracking module 204 can identify which computing devices are identified as infected with malware in various manners. In one or more embodiments, the infection tracking module receives malware determinations from the malware determination module 208 as discussed in more detail below. Additionally or alternatively, the infection tracking module receives information regarding infections of a computing device 102 from the computing device 102 itself (e.g., anti-malware program running on a computing device 102 can notify the risk determination system 104 when malware is encountered).

The infection tracking module 204 maintains a record of which computing devices 102 have been infected with malware. The infection tracking module 204 also maintains timing information for infections of computing devices, such as the date and time of infection, the date and time indication of infection was received by the infection tracking module 204, what remediation steps were performed (e.g., user was prompted and chose to quarantine an infected file), information about the severity of the malware infection (e.g., as determined previously by a specialist such as an antivirus researcher), and so forth. A correspondence between computing devices 102 and any infections is also maintained in the data store 210. This correspondence can be maintained in various manners, such as a record, table, or other database of computing devices. This correspondence allows the risk determination system 104 to readily determine, for a given computing device 102, whether the computing device has been infected with malware and if so when (e.g., how long ago) that infection occurred.

In one or more embodiments, at least some of the information maintained by the infection tracking module 204 is also used by the risk factor determination module 206 to identify a risk factor for content. The information regarding infections (e.g., severity of a previous malware infection) can be, for example, attributes or activity of the computing device.

The risk factor determination module 206 analyzes the indication of the content, attributes of the computing device, and activity of the computing device to determine a risk factor for the content. The risk factor determination module 206 determines the risk factor using any of a variety of different algorithms, rules, or techniques. In one or more embodiments, the risk factor determination module 206 uses a machine learning algorithm to determine the risk factor, such as a logistic regression model. Additionally or alternatively, the risk factor determination module 206 can use other machine learning algorithms or models, such as a deep neural network, any of a variety of different clustering algorithms, other types of regression models, any of a variety of sequence labeling algorithms, decision trees, and so forth.

The risk factor determination module 206 labels each of multiple computing devices 102 as either infected or not infected over some time duration (e.g., the previous 60 or 90 days). This information regarding whether a computing device has been infected in the time duration is readily available from the information stored in the data store 210 by the infection tracking module 204. The machine learning algorithm is then trained using the attributes and activities of the infected computing devices as well as the attributes and activities of the not infected computing devices to generate a risk factor for a computing device based on the attributes of the computing device. This training of the machine learning algorithm can be performed using any of a variety of different public and/or proprietary techniques, allowing the machine learning algorithm to determine which attributes are associated with infected computing devices and which attributes are associated with not infected computing devices. The machine learning algorithm can be trained at various times, such as at regular or irregular intervals (e.g., daily or weekly), in response to other events (e.g., recent discovery of a new type of malware), and so forth.

In one or more embodiments, the space of all computing devices 102 is divided into multiple sub-spaces (e.g., by geographical region), and a different machine learning algorithm is trained for each of those different sub-spaces. This can allow for better results than attempting to train a single machine learning algorithm across all devices. For example, there might be geographic locations where certain software publishers are more prevalent (e.g., a piece of software is very commonly used only in one country but is also a good channel for malware transmission). By training different machine learning algorithms for different geographical regions, that piece of software running on devices that are not located in that one country is more likely to be determined to be malware than when running on devices that are located in that one country.

The risk factor determination module 206 determines, given a set of attributes for a computing device and activity of a computing device, a risk factor for the computing device. This risk factor is an indicator of the probability or likelihood of the computing device being infected with malware sometime in the future. The risk factor can be any of a variety of different ratings or values, such as a binary indication (e.g., risky or not risky), an integer scale from 1 to 10 with 1 indicating very risky and 10 indicating very safe (not risky), and so forth.

When content is received by the risk determination system 104 from a particular computing device 102, the risk factor determination module 206 uses the attributes and activity of that particular computing device 102 to determine the risk factor of the particular computing device 102. The risk factor determination module 206 provides the risk factor to the malware determination module 208, which uses the risk factor to determine whether particular content on the particular computing device 102 is malware.

The malware determination module 208 applies various different rules, criteria, or algorithms to at least the risk factor to determine whether the content is malware. In one or more embodiments, the malware determination module 208 applies a threshold value rule to the risk factor. In applying the threshold value rule, the malware determination module 208 checks whether the risk factor satisfies a threshold value (e.g., is greater than the threshold value, or is equal to or greater than the threshold value). If the risk factor satisfies the threshold value, then the content is malware. However, if the risk factor does not satisfy the threshold value (e.g., the risk factor is less than the threshold value, or the risk factor is equal to or less than the threshold value), then the content is not malware.

The malware determination module 208 can additionally or alternatively apply various other rules to determine whether content is malware. In one or more embodiments, the malware determination module 208 has access to a list of indicators of known non-malware content. This list can be maintained, for example, in the data store 210. If the indication of content received from the computing device 102 matches (e.g., is the same as) an indicator of known non-malware content, then the malware determination module 208 determines that the indicated content is not malware. The malware determination module 208 can determine that the indicated content is not malware regardless of the risk factor determined by the risk factor determination module 206 for the content on the computing device. Alternatively, the malware determination module 208 can signal the risk factor determination module 206 to not determine a risk factor for the content because the content is already known to not be malware.

The malware determination module 208 provides an indication of the malware determination to the computing device 102 from which the indication of content was received. The indication can be, for example, an indication of whether the risk determination system 104 determines that the content is malware. Additionally or alternatively, the malware determination module 208 can provide various other information to the computing device 102, such as an indication for the computing device 102 to change the manner in which the computing device interacts with the content (and optionally additional content as well). For example, the malware determination module 208 can provide an instruction to an anti-malware program running on the computing device 102 to collect files or other content more aggressively for analysis by the risk determination system 104 (e.g., for computing device that are categorized as risky, such as having at least a threshold risk factor), an indication for an anti-malware program running on the computing device 102 to perform a quick and/or full system scan, an indication for the computing device 102 to enforce operating system and/or anti-malware program update settings, an indication for an anti-malware program running on the computing device 102 to change to a paranoid mode (e.g., for the anti-malware program to more aggressively validate content and/or settings), and so forth.

Thus, using the techniques discussed herein, if risk determination system 104 receives an indication of content from a particular computing device that is not known to be definitely malware or definitely not malware, the malware determination module 208 can make a determination as to whether the content should be considered to be malware on the particular computing device. This determination is based on attributes and activity of the particular computing device, so if the particular computing device has attributes and/or activity that the risk factor determination module 206 associates with riskier computing devices (based on infections of the computing devices 102), then the content is more likely to be determined to be malware on the particular computing device. However, if the particular computing device has attributes and/or activity that the risk factor determination module 206 associates with less risky computing devices (based on infections of the computing devices 102), then the content is more likely to be determined to not be malware on the particular computing device. The determination of whether content is malware can thus be made more accurately and automatically by basing the decision at least in part on attributes of the computing device.

Additionally, the use of the risk factor discussed herein reduces the manual input required by an administrator or user of the risk determination system, increasing the automated malware determination process. The malware determination is made based at least in part on attributes of the computing device on which the content is being accessed (e.g., run, downloaded, installed, etc.), thereby increasing the chances of detecting previously unknown malware (e.g., zero day attacks).

Furthermore, using the techniques discussed herein, if risk determination system 104 receives an indication of content from a particular computing device that the risk determination system 104 has no prior knowledge about (e.g., the particular computing device is a new, out-of-the-box computing device), the risk determination system 104 can still make a determination as to whether content should be considered to be malware on the particular computing device. Despite having no prior knowledge about the computing device, the risk determination system 104 can make determinations about whether content should be considered to be malware on the computing device based on the attributes and/or activity of the computing device.

It should be noted that, in one or more embodiments, the more specific the device functionality is (e.g., as indicated by the attributes of the computing device), the easier the risk calculation will be for the risk determination system. For example, if an IoT device only checks for temperature, then only limited and specific processes will typically run on the IoT device, and anything beyond those should not be executed on that IoT device. If there is an unsigned process (e.g., content that is not known to the risk determination system, or is not digitally signed by a trusted authority), or any other unknown application is running, the risk determination system can determine that the content is likely malware much easier and with a higher degree of accuracy.

Figure 3:
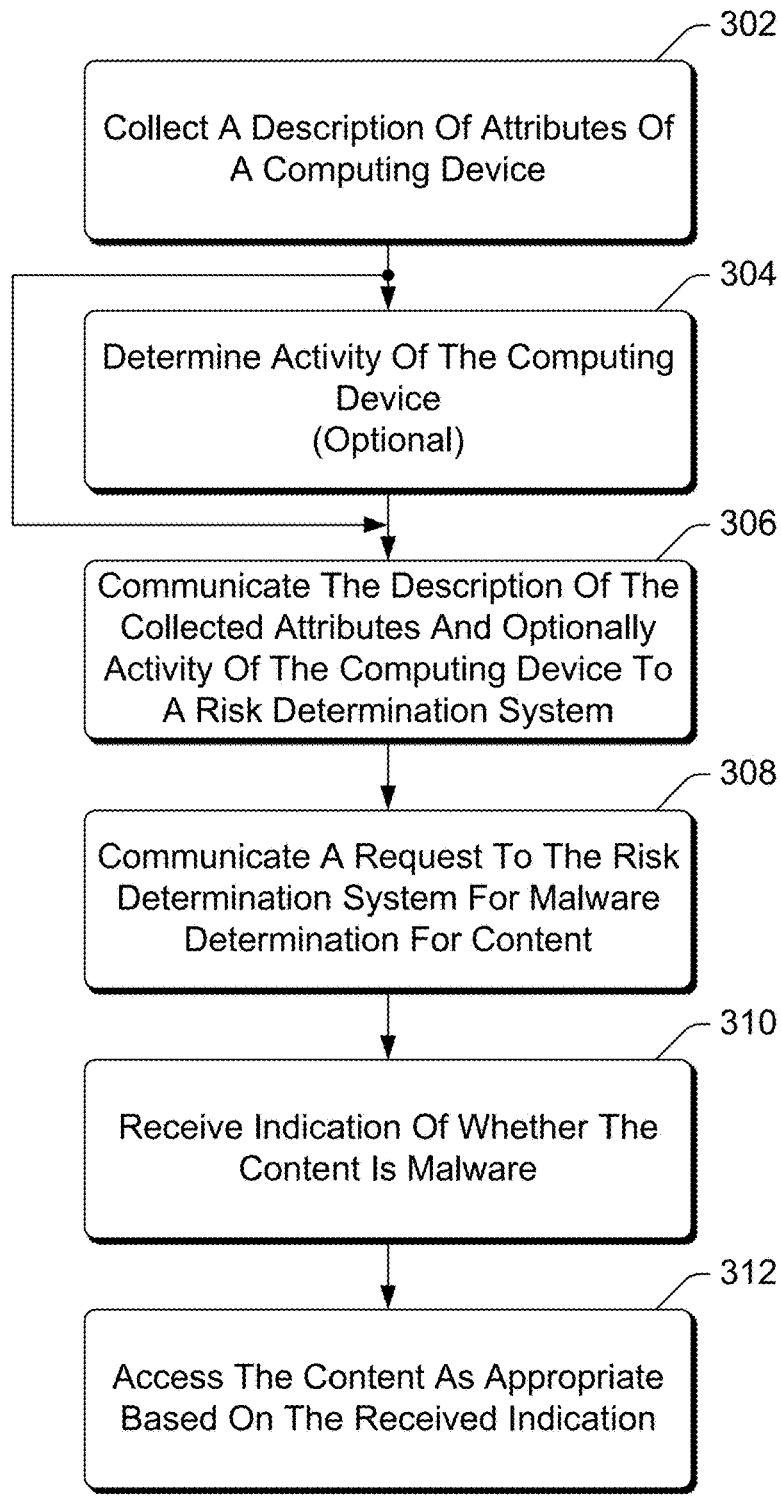
FIGS. 3 and 4 are flowcharts illustrating example processes for implementing the computing device protection based on device attributes and device risk factor in accordance with one or more embodiments.

FIG. 3 is a flowchart illustrating an example process 300 for implementing the computing device protection based on device attributes and device risk factor in accordance with one or more embodiments. Process 300 is carried out by a computing device, such as a computing device 102 of FIG. 1, and can be implemented in software, firmware, hardware, or combinations thereof. Process 300 is shown as a set of acts and is not limited to the order shown for performing the operations of the various acts. Process 300 is an example process for implementing the computing device protection based on device attributes and device risk factor; additional discussions of implementing the computing device protection based on device attributes and device risk factor are included herein with reference to different figures.

In process 300, a description of attributes of a computing device implementing process 300 is collected (act 302). These attributes can include, for example, hardware specifications of the computing device, operating system specifications of the computing device, anonymized information regarding a user of the computing device, information describing anti-virus or other anti-malware program settings on the computing device, information describing programs running on the computing device, combinations thereof, and so forth as discussed above. The description of attributes of a computing device can take various forms, such as a list, table, record, or other data structure.

The activity of the computing device is optionally determined (act 304). The activity of the computing device refers to an amount that the computing device is used or a frequency of use of the computing device as discussed above.

The description of the collected attributes is communicated to a risk determination system (act 306). The description of the collected attributes can be communicated to the risk determination system at various times, such as in response to a change in the attributes of the computing device, upon initial collection of the description of attributes of the computing device, along with a request to determine whether particular content is malware, and so forth. In situations in which the activity of the computing device is determined in act 304, a description of the activity of the computing device is also communicated to the risk determination system in act 306 as well.

A request for a malware determination for content is also communicated to the risk determination system (act 308). This request is a request to determine whether particular content is malware on the computing device implementing process 300. The request can be communicated to the risk determination system at various times, such as when the content is run, when the content is downloaded or otherwise stored on the computing device, and so forth.

An indication of whether the content is malware is received from the risk determination system (act 310). Whether the content is malware is determined by the risk determination system based at least in part on the attributes of the computing device implementing process 300 and/or the activity of the computing device implementing process 300.

The content is then accessed as appropriate based on the received indication (act 312). For example, if the indication received in act 310 indicates that the content is not malware, then the content can be run, opened, installed, etc. However, if the indication received in act 310 indicates that the content is malware, then the content can be deleted, quarantined, prevented from being installed, and so forth.

Additional information can additionally or alternatively be received in act 310, in which case different actions can be performed in act 312. For example, an indication to change the behavior of the computing device can be received in act 310, and that change carried out in act 312, such as by collecting content more aggressively for analysis, performing a quick and/or full system scan, and so forth as discussed above.

Figure 4:
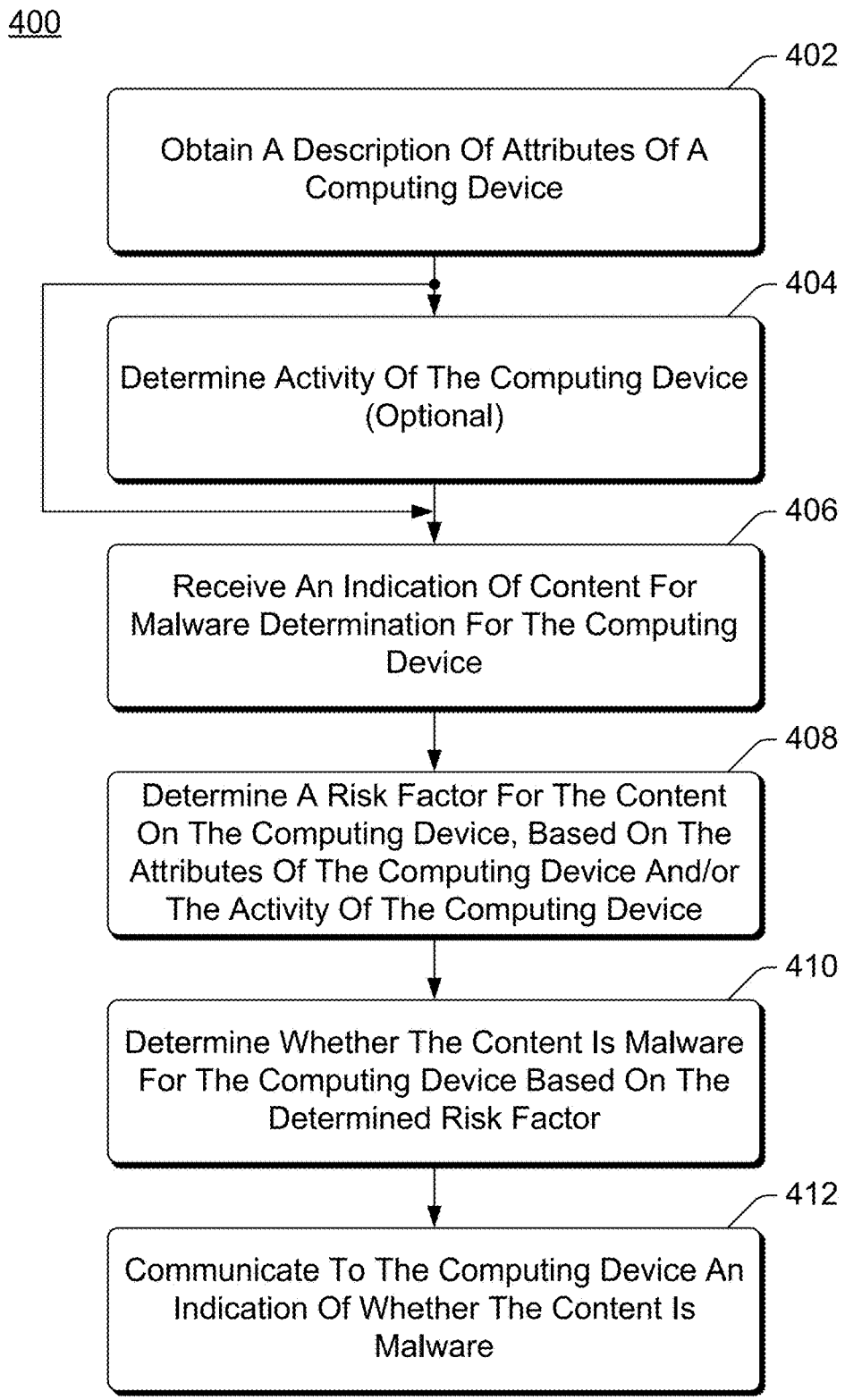

FIG. 4 is a flowchart illustrating an example process 400 for implementing the computing device protection based on device attributes and device risk factor in accordance with one or more embodiments. Process 400 is carried out by a risk determination system, such as risk determination system 104 of FIG. 1 or FIG. 2, and can be implemented in software, firmware, hardware, or combinations thereof. Process 400 is shown as a set of acts and is not limited to the order shown for performing the operations of the various acts. Process 400 is an example process for implementing the computing device protection based on device attributes and device risk factor; additional discussions of implementing the computing device protection based on device attributes and device risk factor are included herein with reference to different figures.

In process 400, a description of attributes of a computing device is obtained (act 402). These attributes can include, for example, hardware specifications of the computing device, operating system specifications of the computing device, anonymized information regarding a user of the computing device, information describing anti-virus or other anti-malware program settings on the computing device, information describing programs running on the computing device, combinations thereof, and so forth as discussed above.

Activity of the computing device is optionally determined (act 404). The activity of the computing device can be determined in different manners as discussed above, such as explicitly based on a description of the activity of the computing device generated and provided by the computing device, or inherently based on other information provided by the computing device (e.g., a frequency with which indications of content are received from the computing device).

An indication of content for malware determination for the computing device is also received (act 406). The receipt of the indication is inherently, or is accompanied by an explicit, request for a determination as to whether the content is malware. The attributes obtained in act 402 can be received along with the indication of content in act 406 and/or can be obtained from other sources (e.g., a data store of the risk determination system).

A risk factor for the content on the computing device is determined based on the attributes of the computing device and/or the activity of the computing device (act 408). The risk factor is determined, for example, using any of a variety of machine learning algorithms or models trained using attributes and/or activities of computing devices that have been infected and have not been infected over a particular time duration as discussed above.

A determination as to whether the content is malware for the computing device is made based on the determined risk factor (act 410). Various rules, algorithms, or techniques can be used to determine whether the content is malware as discussed above. The determination in act 410 can be made solely based on the determined risk factor, or alternatively can be made in conjunction with other signals or inputs.

The indication of whether the content is malware is communicated to the computing device (act 412). The indication is returned to the computing device that sent the indication of the content to the risk determination system in act 406.

Additional information can additionally or alternatively be communicated to the computing device in act 412. For example, an indication to change the behavior of the computing device can be communicated to the computing device in act 412, such as for the computing device to collect content more aggressively for analysis, for an anti-malware program on the computing device to perform a quick and/or full system scan, and so forth as discussed above.

In the discussions herein, the risk determination system is described as being separate from the computing devices that have the content for which the malware determination is being made. Additionally or alternatively, at least part of the risk determination system can be implemented in the computing devices themselves rather than the risk determination system. For example, malware determination module 208 of FIG. 2 may be implemented at least in part by the computing devices 102 of FIG. 1, with the malware determination module on the computing devices 102 receiving indications of risk factors form the risk determination system 104 of FIG. 1. By way of another example, the risk factor determination module 206 maybe implemented at least in part by the computing devices 102 of FIG. 1, such as by the risk determination system 104 training a machine learning algorithm or model and communicating the machine learning algorithm or model to the computing devices 102 of FIG. 1, allowing each of the computing devices 102 of FIG. 1 to determine its own risk factor based on its own attributes.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
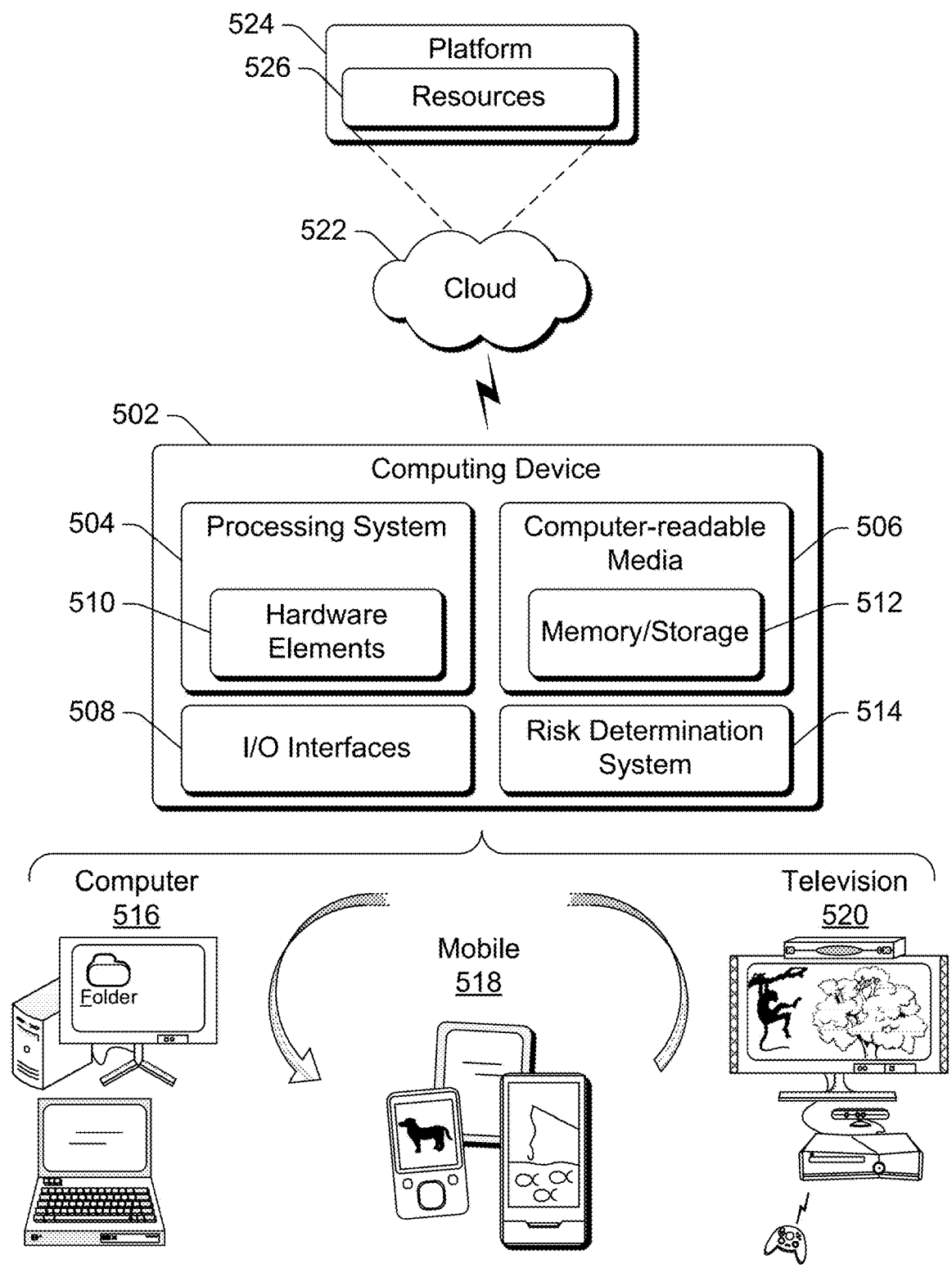
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Resistive RAM (ReRAM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a risk determination system 514. The risk determination system 514 provides various risk factor and malware determination functionality as discussed above. The risk determination system 514 can implement, for example, the risk determination system 104 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, server, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining a description of attributes of a computing device; receiving, from the computing device, an indication of content to be accessed at the computing device; determining, based on the attributes of the computing device, a risk factor for the computing device; using the risk factor the computing device as well as the indication of the content to determine whether the content is malware on the computing device; and communicating to the computing device an indication of whether the content on the computing device is determined to be malware.

Alternatively or in addition to any of the above described methods, any one or combination of: the method further comprising determining activity of the computing device, and the determining the risk factor for the computing device comprising determining the risk factor for the computing device based on the attributes of the computing device and the activity of the computing device; the attributes including hardware specifications of the computing device; the attributes including operating system specifications of the computing device; the attributes including anonymized information regarding a user of the computing device; the attributes including information describing programs running on the computing device; the indication of the content comprising a hash value generated by applying a hash function to at least a portion of the content; the indication of the content comprising the content; the using the risk factor to determine whether the content is malware comprising determining that the content is malware in response to the risk factor satisfying a threshold value; the determining the risk factor comprising using a machine learning algorithm or model trained using a first set of computing devices that have been infected over a particular time duration and a second set of computing devices that have not been infected over the particular time duration.

A method implemented on a computing device, the method comprising: collecting a description of attributes of the computing device; communicating the description of the attributes of the computing device to a risk determination system; communicating, to the risk determination system, a request for a determination of whether content at the computing device is malware; and receiving, from the risk determination system, an indication of whether the content is malware, the indication being based on a risk factor for the computing device, the risk factor for the computing device being based on the attributes of the computing device.

Alternatively or in addition to any of the above described methods, any one or combination of: the method further comprising communicating the description of the attributes of the computing device to the risk determination system along with the request for the determination whether the content at the computing device is malware; the attributes including hardware specifications of the computing device and operating system specifications of the computing device; the attributes including information describing security settings on the computing device; the attributes including information describing programs running on the computing device.

A computing device comprising: a device attribute determination module configured to collect a description of attributes of the computing device; and a risk check module configured to communicate the description of the attributes of the computing device to a risk determination system, communicate, to the risk determination system, a request for a determination of whether content at the computing device is malware, and receive, from the risk determination system, an indication of whether the content is malware, the indication being based on a risk factor for the computing device, the risk factor for the computing device being based on the attributes of the computing device.

Alternatively or in addition to any of the above described computing devices, any one or combination of: wherein to communicate the request to the risk determination system is to communicate the description of the attributes of the computing device to the risk determination system along with the request for the determination whether the content at the computing device is malware; the attributes including hardware specifications of the computing device and operating system specifications of the computing device; the attributes including information describing security settings on the computing device; the attributes including information describing programs running on the computing device.

A risk determination system comprising: one or more processors; and one or more computer-readable storage media having stored thereon multiple instructions that, responsive to execution by the one or more processors, cause the one or more processors to: receive, from a computing device, both a description of attributes of the computing device and an indication of content to be accessed at the computing device; determine, based on the attributes of the computing device, a risk factor for the content on the computing device; determine, using the risk factor for the content on the computing device as well as the indication of the content, whether the content is malware on the computing device; and communicate to the computing device an indication of whether the content on the computing device is determined to be malware.

Alternatively or in addition to any of the above described computing devices, any one or combination of: wherein to determine whether the content is malware is to determine that the content is malware in response to the risk factor satisfying a threshold value, and determine that the content is not malware in response to the risk factor not satisfying the threshold value; wherein to determine the risk factor for the content on the computing device is to provide the attributes of the computing device as inputs to a machine learning algorithm or model trained using a first set of computing devices that have been infected over a particular time duration and a second set of computing devices that have not been infected over the particular time duration; the attributes including hardware specifications of the computing device, operating system specifications of the computing device, and information describing anti-virus or other anti-malware program settings on the computing device; the attributes further including information describing programs running on the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   obtaining a description of attributes of a computing device, the attributes including information of a hardware specification of the computing device, a publisher identifier of a software publisher of software utilizable by the computing device, and anonymized information regarding a user of the computing device;
   receiving, from the computing device, a content identifier of content accessible at the computing device, the content different from the software;
   determining, based at least on the description of attributes of the computing device and a correlation of the software with malware, a risk factor for the computing device;
   determining, based on the risk factor and the content identifier, that the content is malware on the computing device; and
   communicating to the computing device an indication that the content on the computing device is determined to be malware, the indication including a prompt to perform a remedial action on the content by the computing device.

2. The method as recited in claim 1, the method further comprising determining activity of the computing device, and the determining the risk factor for the computing device comprising determining the risk factor for the computing device based on the description of attributes of the computing device and the activity of the computing device, the activity of the computing device comprising an amount that the computing device is used.

3. The method as recited in claim 1, the attributes including an operating system specification of the computing device.

4. The method as recited in claim 1, the attributes including information describing programs that run on the computing device.

5. The method as recited in claim 1, the content identifier comprising a hash value generated by applying a hash function to at least a portion of the content.

6. The method as recited in claim 1, the content identifier comprising the content.

7. The method as recited in claim 1, wherein said determining that the content is malware on the computing device based on the risk factor and the content comprises:
   determining that the content is malware in response to the risk factor satisfying a threshold value.

8. The method as recited in claim 1, the determining the risk factor comprising using a machine learning algorithm or model trained using a first set of computing devices that have been infected over a particular time duration and a second set of computing devices that have not been infected over the particular time duration.

9. The method as recited in claim 1, the hardware specification of the computing device comprising one or more from a group including: a form factor of the computing device, a make and model of the computing device, and an architecture of a processor of the computing device.

10. The method as recited in claim 1, the method further comprising determining activity of the computing device, and the determining the risk factor for the computing device comprising determining the risk factor for the computing device based on the description of attributes of the computing device and the activity of the computing device, the activity of the computing device comprising a frequency of use of the computing device.

11. A method implemented on a computing device, the method comprising:
    collecting a description of attributes of the computing device, the attributes including information of a hardware specification of the computing device, a publisher identifier of a software publisher of software utilizable by the computing device, and anonymized information regarding a user of the computing device;
    communicating the description of the attributes of the computing device to a risk determination system;
    communicating, to the risk determination system, a request for a determination of whether content at the computing device is malware, the content different from the software;
    receiving, from the risk determination system, an indication that the content is malware, the indication being based on a risk factor for the computing device, the risk factor for the computing device being based at least on the description of attributes of the computing device and a correlation of the software with malware; and
    performing a remedial action on the content based on the indication that the content is indicated as being malware.

12. The method as recited in claim 11, further comprising communicating the description of the attributes of the computing device to the risk determination system along with the request for the determination whether the content at the computing device is malware.

13. The method as recited in claim 11, the attributes including an operating system specification of the computing device.

14. The method as recited in claim 11, the attributes including information describing security settings on the computing device.

15. The method as recited in claim 11, the attributes including information describing programs that run on the computing device.

16. A risk determination system comprising:
one or more processors; and
one or more computer-readable storage media having stored thereon multiple instructions that, responsive to execution by the one or more processors, cause the one or more processors to:
receive, from a computing device, both a description of attributes of the computing device and a content identifier of content accessible at the computing device, the attributes including information of a hardware specification of the computing device, a publisher identifier of a software publisher of software utilizable by the computing device, and anonymized information regarding a user of the computing device;
determine, based at least on the description of attributes of the computing device and a correlation of the software with malware, a risk factor for the content on the computing device, the content different from the software;
determine, using the risk factor for the content on the computing device as well as the content identifier, that the content is malware on the computing device; and
communicate to the computing device an indication that the content on the computing device is determined to be malware, the indication including a prompt to perform a remedial action on the content by the computing device.

17. The risk determination system computing device as recited in claim 16, wherein to determine that the content is malware is to determine that the content is malware in response to the risk factor satisfying a threshold value.

18. The risk determination system computing device as recited in claim 16, wherein to determine the risk factor for the content on the computing device is to provide the description of attributes of the computing device as inputs to a machine learning algorithm or model trained using a first set of computing devices that have been infected over a particular time duration and a second set of computing devices that have not been infected over the particular time duration.

19. The risk determination system computing device as recited in claim 16, the attributes including an operating system specification of the computing device, and information describing anti-virus or other anti-malware program settings on the computing device.

* * * * *